Sept. 20, 1949. H. F. CROMWELL ET AL 2,482,323
CONVERTIBLE TOP CONSTRUCTION FOR MOTOR VEHICLES
Filed April 22, 1947

G. R. MCCOOL
H. F. CROMWELL
INVENTORS
Edwin C. McRae
BY John R. Faulkner
Thomas H. Astin
ATTORNEYS.

Patented Sept. 20, 1949

2,482,323

UNITED STATES PATENT OFFICE 2,482,323

CONVERTIBLE TOP CONSTRUCTION FOR MOTOR VEHICLES

Herbert F. Cromwell, Detroit, and Guy R. McCool, Dearborn, Mich., assignors to Ford Motor Company, Dearborn, Mich., a corporation of Delaware Application April 22, 1947, Serial No. 743,088

6 Claims. (Cl. 296—107)

This invention relates generally to motor vehicles, and has particular reference to improvements in vehicle bodies of the convertible top type.

One of the principal disadvantages of the convertible type of automobile body, in which a canvas or fabric top is adapted to be raised or lowered either manually or by hydraulically actuated mechanism, is that it is extremely difficult to provide and maintain an adequate seal between the top and the body and to prevent the entrance of moisture and air drafts which necessarily result in passenger discomfort. Particularly hard to seal has been the portion of the top adjacent the rearward edges of the windows. This portion of the top is constructed in the form of a flap on each side to enable the top to be collapsed and properly stowed when in its lowered position. Snap fasteners are usually provided along the lower edges of these flaps to button the flaps to the upper edge of the body panel. In operation, these fasteners often become disconnected when the top is lowered and may remain that way when the top is again raised, since the driver may not take the trouble to properly secure them. In addition, the forward concave shaped edges of the flaps which overlap the marginal edges of the rear quarter windows often fail to provide an adequate seal between the top and the windows, particularly after the car has been used for some time and exposed to the weather. These factors contribute to the fact that convertible bodies are usually far from weather-tight even when new and usually become worse as time goes on, resulting in discomfort to the passengers particularly in cold weather.

It is accordingly an object of the present invention to obviate the foregoing disadvantages of the conventional construction by providing means for creating and maintaining an effective weather seal between a convertible top and the car body. This is accomplished by providing spring assemblies in the marginal edges of the top adjacent the upper and rearward edges of the rear quarter windows. Each spring assembly includes an elongated coil spring mounted in a pocket formed in the edge of the top and having one end operatively connected to a structural member of the top and the other end connected to a portion of the body. The arrangement is such that when the top is raised the spring is placed under tension and exerts forces along the entire edge of that portion of the top tending to hold the top tightly against the marginal edges of the rear quarter windows. In addition, the spring assemblies exert downward forces upon the flap portions of the top and hold them tightly against the upper edges of the body panel. One feature of this construction is that it is entirely automatic and requires no attention by the driver, automatically coming into action when the top is raised. In addition, it is simple, inexpensive to manufacture, and easy to install.

Other objects and advantages of this invention will be made more apparent as this description proceeds, particularly when considered in connection with the accompanying drawing.

Figure 5 is an enlarged cross sectional view taken substantially on the plane indicated by the lines 5—5 of Figure 1.

Figure 1:
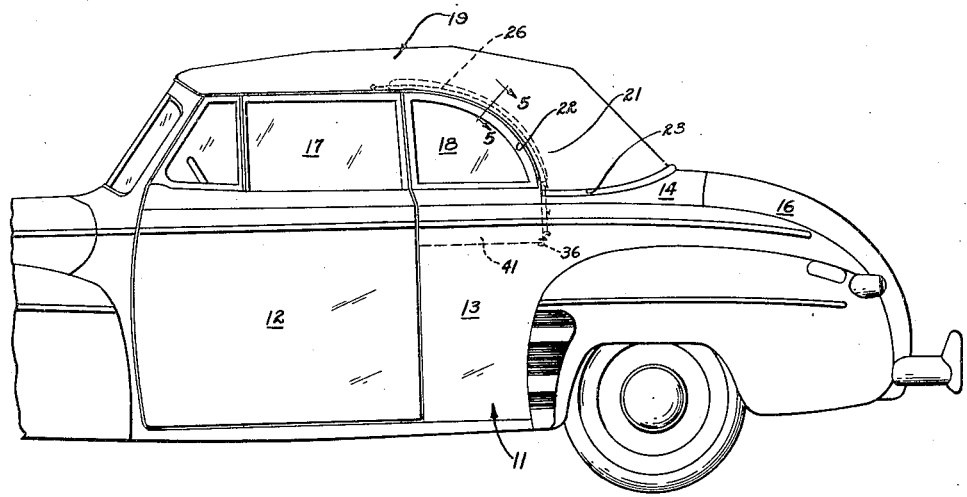
Figure 1 is a fragmentary side elevational view of a motor vehicle having a body of the convertible type embodying the present invention.
Figure 3:
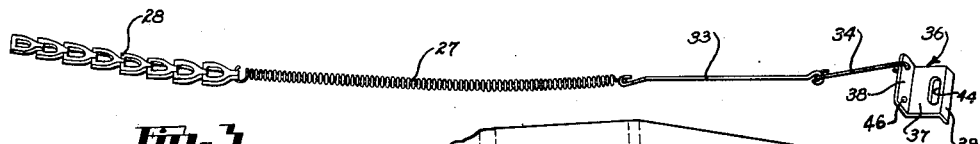
Figure 3 is a perspective view of the spring assembly removed from the top.

Referring now more particularly to the drawings, the reference character 11 indicates generally a vehicle body including a door 12, side panel 13, quarter panel 14 and rear deck 16. A conventional sliding window 17 is mounted in the door 12 and a pivoted swinging window 18 is mounted above the side panel 13.

The top 19 is generally of conventional construction and has flap portions 21 on opposite sides adjacent the rearward edges of the swinging windows 18. It will be noted that the forward edge 22 of each flap is generally concave in shape corresponding to the shape of the rearward edge of the window 18 and is arranged to slightly overlap the window. The lower edge 23 of each flap portion 21 extends along the upper edge of the quarter panel 14, being attached thereto for a portion of its length but being disconnected therefrom adjacent its forward portion so as to permit the top to be collapsed and stowed within the well in back of the seat when the top is lowered. It is the edge portions 22 and 23 which are normally difficult to maintain in weather-tight sealing engagement with the window and the body respectively in the conventional convertible construction which the present invention is particularly concerned with.

Figure 2:
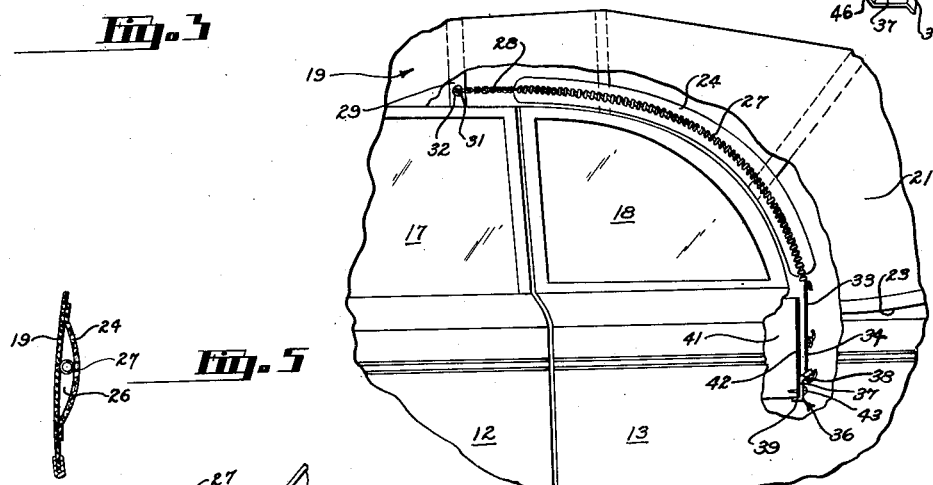
Figure 2 is an enlarged elevational view of a portion of Figure 1 with part of the top broken away to show more in detail the construction of the invention.

As best seen in Figures 2 and 5, a fabric strip 24 is stitched to the inner side of the top material 19 along the concave marginal edge 22 to form an elongated pocket 26. A long coil spring 27 of relatively small diameter is assembled in the pocket 26 and extends substantially the entire length thereof. At its upper and forward end the spring 27 is connected to a short link chain 28, the forward end of which is in turn secured to a cross bow 29 of the top by a fastening element comprising a screw 31 and washer 32. It will be seen that the forward end of the chain is thus anchored to a structural part of the top and is rigidly held when the top is in its raised position.

Figure 4:
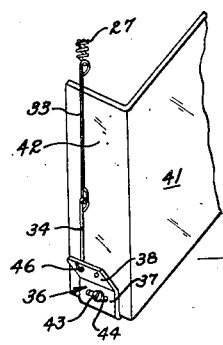
Figure 4 is a fragmentary perspective view illustrating the attachment of the spring assembly to the body.

The opposite or rearward and lower end of the spring 27 is connected by means of a long link 33 and a short link 34 to a supporting bracket 36 mounted upon the body. As best seen in Figures 2 and 4, the supporting bracket 36 is generally Z-shaped in cross section having a body portion 37 and upper and lower flanges 38 and 39 respectively. Although the bracket 36 is adapted to be connected to any convenient part of the vehicle body, depending upon the particular construction, in the type of body shown, the bracket is connected to a plate 41 spaced inwardly from and mounted upon the side panel 13. The plate 41 functions as a support for the window regulating mechanism (not shown) for the swinging window 18 and has a rearward flange 42 extending generally transversely. The body portion 37 of the supporting bracket 36 is mounted upon the flange 42 of the plate by means of a fastening element such as a metal screw 43 and additional strength is afforded by the engagement of the lower flange 39 of the bracket with the lower edge of the flange 42 of the plate. Transverse adjustment of the bracket 36 upon the plate is afforded by the slot 44 formed in the bracket to permit the spring assembly to be mounted in proper alignment to insure an effective weather-tight seal between the top and the body. The upper flange 38 of the supporting bracket 36 extends rearwardly and is provided with a pair of spaced holes 46. The short link 34 is connected at its lower end to the supporting bracket 36, the two holes 46 providing additional transverse adjustment.

When the top is lowered, the spring assembly is inoperative and due to its flexibility does not interfere with the collapsing and stowing of the top. When the top is raised, however, the elongated spring 27 is placed under a predetermined amount of tension and, being restrained within the pocket 26 formed in the marginal edge of the top, exerts downward and forward forces along that entire portion of the top tending to hold the flap 21 taut and the forward concave edge 22 thereof tightly against the marginal edge of the swinging window 18. It will be seen that by properly adjusting the anchor for the lower end of the spring assembly in a transverse direction, an inward force of the desired amount can be applied to the edge 22 of the top to hold it in tight lateral engagement with the window 18. As mentioned before, this transverse adjustment of the lower anchor can be made by selectively positioning the lower end of the short link 34 in either one of the two holes 46 provided in the upper flange 38 of the supporting bracket 36, and also by adjusting the bracket transversely with respect to the plate 41 by means of the slot 44 and the fastening screw 43.

In addition to thus providing an adequate weather-tight seal between the edge 22 of the top and the adjacent window 18, a tight sealing engagement is also effected between the lower edge 23 of the top and the adjacent upper edge of the quarter panel 14. This is effected by means of the downward force exerted upon the flap 21 of the top by means of the spring assembly, and has proved to be so effective that the usual fastening elements provided along this edge can be completely eliminated.

The entire spring assembly can be readily assembled to the vehicle by threading the spring through holes in opposite ends of the elongated pocket 26, attaching the forward end of the chain to the crossbow and then, while the top is partially lowered, fastening the supporting bracket 36 to the plate 41.

It will be apparent from the foregoing description and the drawings that the construction provided is inexpensive and easy to install, yet it is extremely effective in providing an adequate weather-tight seal between a critical portion of top and the body. In operation it is entirely automatic, and requires no attention on the part of the driver and consequently the weather-tight seal can be maintained throughout the life of the vehicle.

Although we have shown and described certain embodiments of the invention, it will be understood that we do not wish to be limited to the exact construction shown and described, but that various changes and modifications may be made without departing from the spirit and scope of our invention, as defined in the appended claims.

What is claimed is:

1. In a motor vehicle having a body and a flexible fabric top adapted to be raised and lowered relative thereto, a pocket formed in said flexible fabric top along one edge thereof, an elongated coil spring in said pocket along the edge of said fabric top, means connecting one end of said spring to said top, and means connecting the other end of said spring to said body, said edge and said pocket assuming a curved shape when the top is raised and said spring being under tension when the top is raised and holding the edge thereof taut.

2. In a motor vehicle having a body and a flexible fabric top adapted to be raised and lowered relative thereto, said top having a generally vertically disposed flap provided with a curved free edge arranged to lie adjacent a portion of said body when said top is raised and having an elongated pocket formed in the curved edge of the flap, a coil spring disposed within said pocket, means connecting the upper end of said spring to said top, and means connecting the lower end of said spring to said body in such manner as to place said coil spring under tension when the top is raised.

3. In a motor vehicle having a body and a flexible fabric top adapted to be raised and lowered relative thereto, said top having a generally vertically disposed flap provided with a free edge substantially concave in shape and arranged to overlie a portion of said body when the top is raised, an elongated pocket formed in said flap along said concave edge, a coil spring disposed within said pocket and extending substantially the entire length thereof, means anchoring the forward and upper end of said spring to said top, and means anchoring the lower and rearward end of said spring to said body in such relationship that said spring is tensioned when the top is raised and exerts forward and downward forces along the concave edge of said top to hold the latter taut and in weather-tight sealing engagement with the adjacent portion of said body.

4. The structure defined by claim 3 which is further characterized in that said means for anchoring the lower and rearward end of said spring to the body comprises a bracket, and means fastening said bracket to said body in a plurality of selected transverse positions to properly align said edge of the top with the adjacent portion of the body to obtain a weather-tight sealing engagement therebetween.

5. In combination with a motor vehicle body having rear quarter windows on opposite sides thereof, a convertible top for said body having generally vertically disposed flaps on opposite sides each of which has a free edge overlapping the adjacent edge of one of the rear quarter windows and another free edge extending along the top of the body panel, a pocket formed in the edge of said flap adjacent said rear quarter window, a spring disposed within said pocket, openings at opposite ends of said pocket, means for anchoring one end of said spring to said top at a point spaced forwardly from the opening at the forward end of said pocket, and means for anchoring the opposite end of said spring to said body at a point spaced downwardly from the opening at the rearward end of said pocket, said last-named means being arranged to place said spring under tension when the top is raised and being adjustable transversely of the vehicle to ensure tight sealing engagement between the free edges of the flaps and said body.

6. In combination with a motor vehicle body having rear-quarter windows on opposite sides thereof, the upper and rearward edges of said rear-quarter windows being convexly curved, a flexible fabric top for said body having a generally horizontal upper portion and a downwardly inclined rearward portion, said top having integral side flaps which are generally vertically disposed and which terminate in free lower edges extending along the top of the body panel but not attached thereto and in concave free forward edges extending along and overlapping the adjacent convexly curved edges of the rear-quarter windows but not attached thereto, a pocket formed in the forward concave free edge of each of said flaps, said pockets being formed by the flexible fabric material of said flaps, an elongated coil spring disposed within each of said pockets and anchored at their upper ends to said top at points spaced forwardly of said rear-quarter windows, and means for anchoring the lower ends of said springs to said body at points spaced below the lower edges of said flaps and arranged to place said springs under tension when the top is raised to exert tension along the free concave forward edges of said flaps to hold the latter against the upper convexly curved edges of said rear-quarter windows to provide a weather-tight seal therebetween and to prevent inadvertent displacement of said flaps from said windows, said last-named means being located laterally in such position as to exert a lateral inward stress upon the free concave edge of said flap to hold said flap tightly against said rear-quarter windows.

HERBERT F. CROMWELL.
GUY R. McCOOL.

REFERENCES CITED

The following references are of record in the file of this patent:

UNITED STATES PATENTS

| Number | Name | Date |
| --- | --- | --- |
| 684,364 | Gordon | Oct. 8, 1901 |
| 1,809,505 | Campbell | June 9, 1931 |
| 2,329,802 | Westrope | Sept. 21, 1943 |

FOREIGN PATENTS

| Number | Country | Date |
| --- | --- | --- |
| 676,239 | Germany | May 30, 1939 |